United States Patent
Pokolm

(10) Patent No.: US 6,637,985 B2
(45) Date of Patent: Oct. 28, 2003

(54) MACHINING TOOL FOR MACHINING WORKPIECES

(76) Inventor: Franz-Josef Pokolm, Starenweg 3, D-33428 Harsewinkel (DE)

( * ) Notice: Subject to any disclaimer, the term of this patent is extended or adjusted under 35 U.S.C. 154(b) by 0 days.

(21) Appl. No.: 10/023,153

(22) Filed: Dec. 17, 2001

(65) Prior Publication Data

US 2002/0081164 A1 Jun. 27, 2002

Related U.S. Application Data

(63) Continuation of application No. PCT/EP00/05291, filed on Jun. 8, 2000.

(30) Foreign Application Priority Data

Jun. 15, 1999 (DE) .......................... 299 10 468
Dec. 17, 1999 (DE) .......................... 199 60 927

(51) Int. Cl.⁷ ........................... B23B 27/00; B23C 5/00
(52) U.S. Cl. ........................... 407/30; 407/33
(58) Field of Search .............. 407/30, 32, 34, 407/33, 46, 53, 119, 40; 408/202, 226

(56) References Cited

U.S. PATENT DOCUMENTS

| 5,005,807 A | * | 4/1991 | Mathews et al. ........... 266/271 |
| 5,114,286 A | * | 5/1992 | Calkins ...................... 408/226 |
| 5,203,654 A | * | 4/1993 | Henderson ................. 408/226 |
| 5,496,137 A | * | 3/1996 | Ochayon et al. ............ 408/226 |
| 5,695,304 A | * | 12/1997 | Ebert ......................... 408/227 |
| 5,899,642 A | | 5/1999 | Berglöw et al. |

FOREIGN PATENT DOCUMENTS

| DE | 3307727 A1 | * 10/1983 | ........... B23B/51/02 |
| DE | G 82 23 278.4 | 7/1987 | |

OTHER PUBLICATIONS

K. Schreyer: "Werkzeugspanner für ISA–Frässpindelköpfe" [tool holder for ISA cutter spindle heads], Werkstattstechnik und Maschinenbau, vol. 40, No. 1, Jan. 1950, pp. 10–16.

* cited by examiner

Primary Examiner—Henry W. H. Tsai
(74) Attorney, Agent, or Firm—Laurence A. Greenberg; Werner H. Stemer; Gregory L. Mayback

(57) ABSTRACT

A rotating machining tool includes a shank that can be clamped into a machine or a machine spindle, and a pin that is machine-molded in one piece with the shank. The pin has a threaded section and a press-fit section. The machining tool also includes a cutter head that is formed with a bore for receiving the pin. The bore is formed with a threaded section for forming a positive fit connection with the threaded section of the pin. The bore is also formed with a press fit section for forming a frictional connection with the press-fit section of the pin.

5 Claims, 1 Drawing Sheet

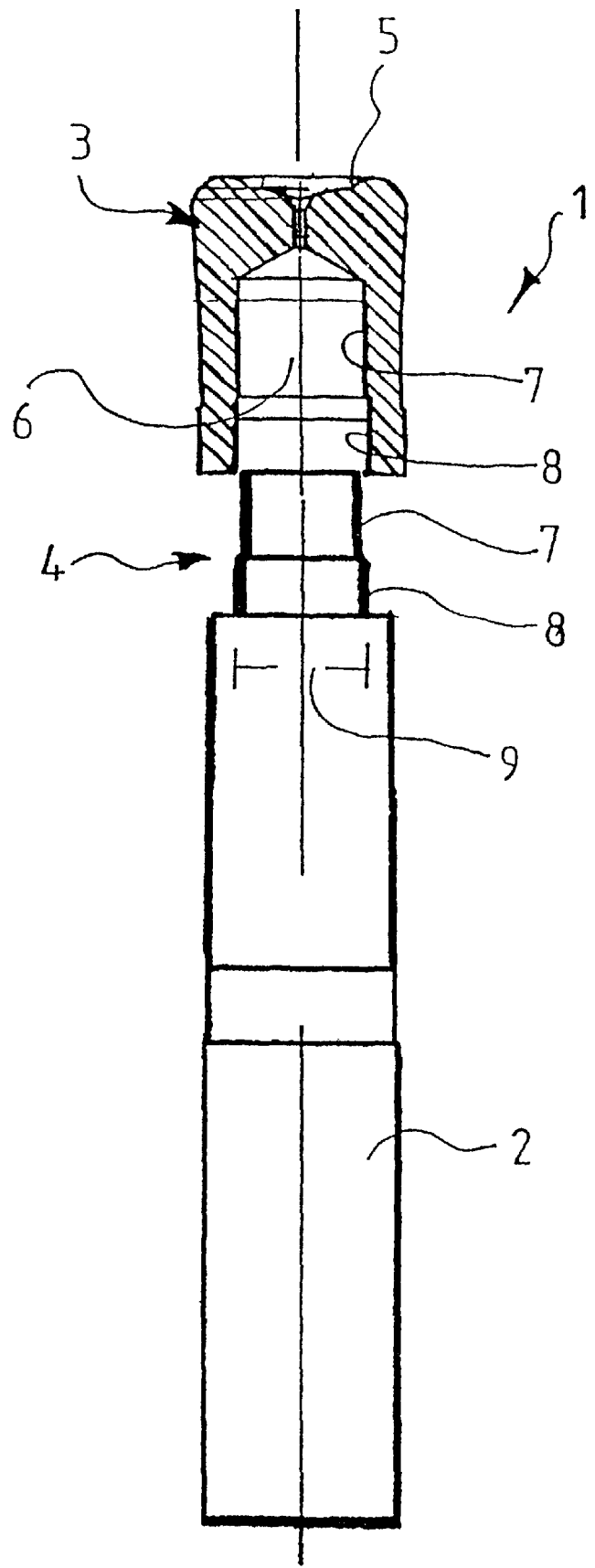

MACHINING TOOL FOR MACHINING WORKPIECES

CROSS-REFERENCE TO RELATED APPLICATION

This application is a continuation of International Application PCT/EP00/05291, filed Jun. 8, 2000, which designated the United States.

BACKGROUND OF THE INVENTION

Field of the Invention

The invention relates to a machining tool, particularly for machining workpieces made of steel. The tool is designed as a rotating tool having a shank that may be clamped into a machine or a machine spindle. The free end of the machining tool has a tool head. A pin is machine-molded to the shank, and the cutter head [end-milling cutter] has a bore adapted to receive the pin. The pin receiving element of the cutter head can be fitted onto the pin with a tight fit and can be fixed to the pin by a frictional connection.

Machining tools are milling cutters, drilling machines, lathe chisels, and the like. These tools have a cutting edge that is often made of inserted cutting blades. One can penetrate more or less deeply into a workpiece by using such tools, and the depth depends on the rigidity and service life of the tool. It is known to fit the cutter head and the shank together using a threaded connection in which the shank is provided with a thread lug and the cutter head is provided with a threaded bore. When the shank and the cutter head are screwed together, they form the tool, which is subsequently screwed into a machine or a machine spindle, for penetrating the material of the workpiece. As a rule, such shanks are made of tool steel to manufacture the thread lug in an economical manner. Furthermore, there are connections known from the prior art in which a pin is machine-molded onto the shank, the cutter head is provided with a bore to receive the pin, and the pin receiving element may be fitted onto the pin by a tight fit. The pin receiving element is fixed on the pin by a frictional connection. These connections between the shank and the tool head have been proven to function well so far. However, true concentric running cannot be ensured in such a connection. In addition, the shank is greatly stressed during deep penetration of the tool into the workpiece so that the steel shaft may be bent during malfunctioning, and this leads to an unbalance that creates problems especially at the usual high speeds and which may lead to the destruction of the machine or the machine spindle.

U.S. Pat. No. 5,899,642 shows a machining tool consisting of a shank, a pull rod, and a mill head. The connection between the pull rod and the mill head consists of a machine-molded frictional connection whereby the mill head is at first fixed onto the pull rod with a tool before the pull rod is also fixed onto the shank with the use of a tool. This design is considered to be disadvantageous because first, the fixing of the mill head is very complicated since bonding of a pull rod is required, and second, the employment of a pull rod could result in additional unbalance in the tool, which ultimately leads to a shorter service life of the tool.

SUMMARY OF THE INVENTION

It is accordingly an object of the invention to provide a machining tool which overcomes the above-mentioned disadvantages of the prior art apparatus of this general type.

In particular, it is an object of the invention to provide a connection between the tool head and the shank that guarantees an improved service life of the tool in or on a machine spindle.

With the foregoing and other objects in view there is provided, in accordance with the invention, a rotating machining tool. The machining tool includes a shank that can be clamped into a machine or a machine spindle, and a pin that is machine-molded in one piece with the shank. The pin has a threaded section and a press-fit section. The machining tool also includes a cutter head that is formed with a bore for receiving the pin. The bore is formed with a threaded section for forming a positive fit connection with the threaded section of the pin. The bore is also formed with a press fit section for forming a frictional connection with the press-fit section of the pin. The press-fit section of the shank is provided with an overdefined section for enabling a thermal snap-back process of the press-fit section of the cutter head.

The shank and the pin are made in one piece. The pin of the shank, and correspondingly thereto, the bore of the cutter head are each provided with a threaded section and a press-fit section to create a positive-fit connection and a frictional connection. The press-fit section of the shank is provided with an overdefined section to enable a thermal snap-back process of the press-fit section of the cutter head. Based on the combination of the two types of connection that are arranged in series between the tool shank and the cutter head, a connection is created that is best suited, especially for the types of stresses that occur when the cutter head is inserted into the material to be milled. Because of the threaded connection there is, on one hand, a positive fit between the pin, which is directly connected to the shank, and the cutter head. This guarantees sufficient stability during the thrust exerted in axial and radial direction by the tool. A frictional connection is established, on the other hand, through a thermal snap-back process that secures the threaded section against loosening on its own. This adjusted connection combination, which is in direct connection to the shank, prevents the cutter head from self-loosening from the shank. In addition, the cutter head is held on the shank in an axially concentric manner because of the press-fit. Unbalancing is thereby prevented—whereas it may occur in the traditional threaded connections. This connection combination between the shank and the cutter head leads to a considerably longer service life of the tool. The press-fit sections themselves may thereby be designed either cylindrically or conically.

In accordance with an added feature of the invention, the shank and also the pin are in made one piece of a hard alloy and/or a heavy metal, and the cutter head is made of steel, titanium, or a similar material. The connection may be produced using a thermal process to create the inventive connection and the parts may be disconnected by again using a thermal process. The cutter head is at first placed on the shank in a manner such that the threads engage only when the cutter head is influenced thermally. The cutter head is heated to such a degree that it can be screwed onto the press-fit section, which is provided with an overdefined section. A connection that can be simply manufactured is made within the scope of the thermal process and is based on the different expansion coefficients. The connection may again be easily disconnected under a corresponding thermal influence, if desired, so that the shank, in particular, may be used again.

Other features which are considered as characteristic for the invention are set forth in the appended claims.

Although the invention is illustrated and described herein as embodied in machining tool, particularly for machining workpieces made of steel, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

The sole drawing FIGURE shows a side view of rotating machining tool.

DESCRIPTION OF THE PREFERRED EMBODIMENTS

Referring now to the sole drawing FIGURE, there is shown a side view of a tool 1 having a partially machine-cut cutter head 5, which is designed for machining workpieces made of steel, in particular. The tool 1 is designed as a rotating tool. The tool 1 is provided with a shank 2 that may be clamped into a machine or a machine spindle, and the free end of the shank 2 is provided with a tool head 3. A pin 4 is machine-molded to the shank 2, and the cutter head 5 is provided with a bore 6 to receive the pin 4. The pin receiving element may be placed onto the pin 4 with a tight fit and may be fixed on the pin 4 by a frictional connection.

The pin 4 of the shank 2, and correspondingly thereto, the bore 6 of the cutter head 5 are each provided with a threaded section 7 and a press-fit section 8 to create a positive-fit connection and a frictional connection, respectively. The press-fit section 8 of the shank 4 is provided with an overdefined section 9 to enable a snap-back process of the press-fit section 8 on the cutter head 5. The press-fit sections 8 themselves may be designed in either a cylindrical or conical form.

The shank 2 and also the pin 4 are made in one piece of a hard alloy and/or of a heavy metal, and the cutter head 5 is made of steel, titanium, or a similar material. The inventive connection may be produced using a thermal process and the shank 2 and the cutting head 5 may be disconnected. The cutting head 5 is heated to a sufficient degree in the area of the connection, such that the cutting head 5 can be screwed onto the press-fit section 8 of the pin 4, and such that the threads of the pin 4 engage the threads of the cutter head 5. The pin 4 has an overdefined section 9. When the connection is cooled down, then a connection combination is created in the transition region leading from the shaft 2 to the cutter head 5. On one side of the transition region, there is a connection formed by a positive-fit connection and on the other side of the transition region, there is a connection formed by a frictional connection.

I claim:

1. A rotating machining tool, comprising:
   a shank for clamping into a component selected from the group consisting of a machine and a machine spindle;
   a pin machine-molded in one piece with said shank, said pin having a threaded section and a press-fit section;
   a cutter head formed with a bore for receiving said pin, said bore formed with a threaded section for forming a positive fit connection with said threaded section of said pin, said bore also formed with a press fit section for forming a frictional connection with said press-fit section of said pin;
   said press-fit section of said shank being provided with an oversizing for enabling a thermal shrink fitting of said press-fit section of said cutter head.

2. The tool according to claim 1, wherein said press-fit section of said pin and said press-fit section of said cutter head have a shape selected from the group consisting of cylindrical and conical.

3. The tool according to claim 1, wherein:
   said shank and said pin are made of a hard alloy metal; and
   said cutter head is made of a material selected from the group consisting of steel and titanium.

4. The tool according to claim 1, wherein:
   the frictional connection is produced and released by a thermal process.

5. The tool according to claim 1, wherein said cutter head is constructed for machining workpieces made of steel.

* * * * *